July 24, 1962 P. D. RUGGERI 3,045,936
MACHINE FOR PULLING SUPPORTING WIRES FROM A TRELLIS
Filed May 29, 1961 3 Sheets-Sheet 1
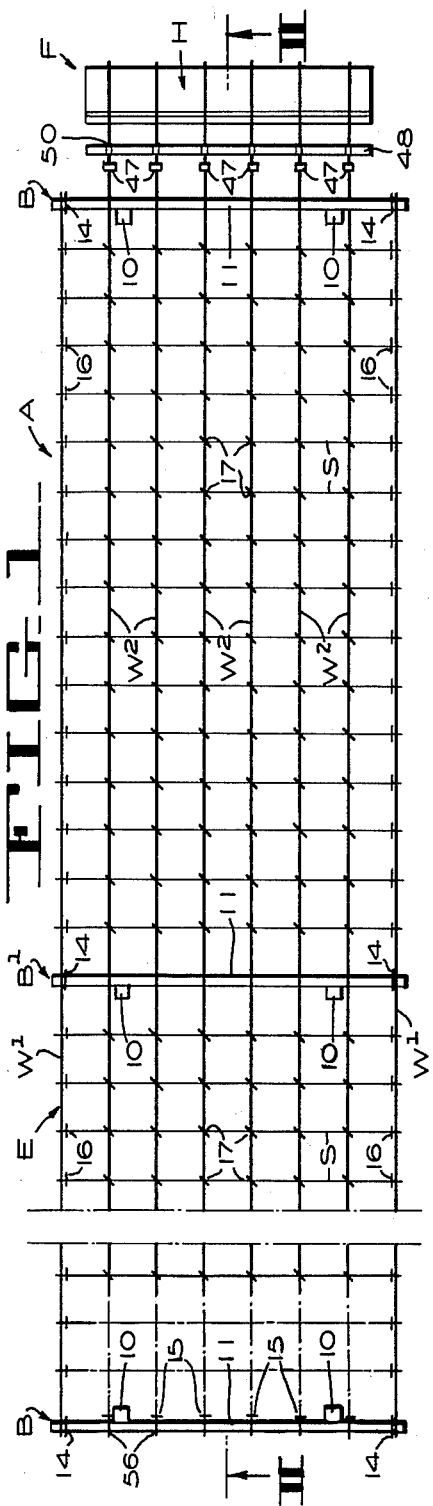
INVENTOR.
PETER D. RUGGERI
BY Joseph F. Cole
ATTORNEY

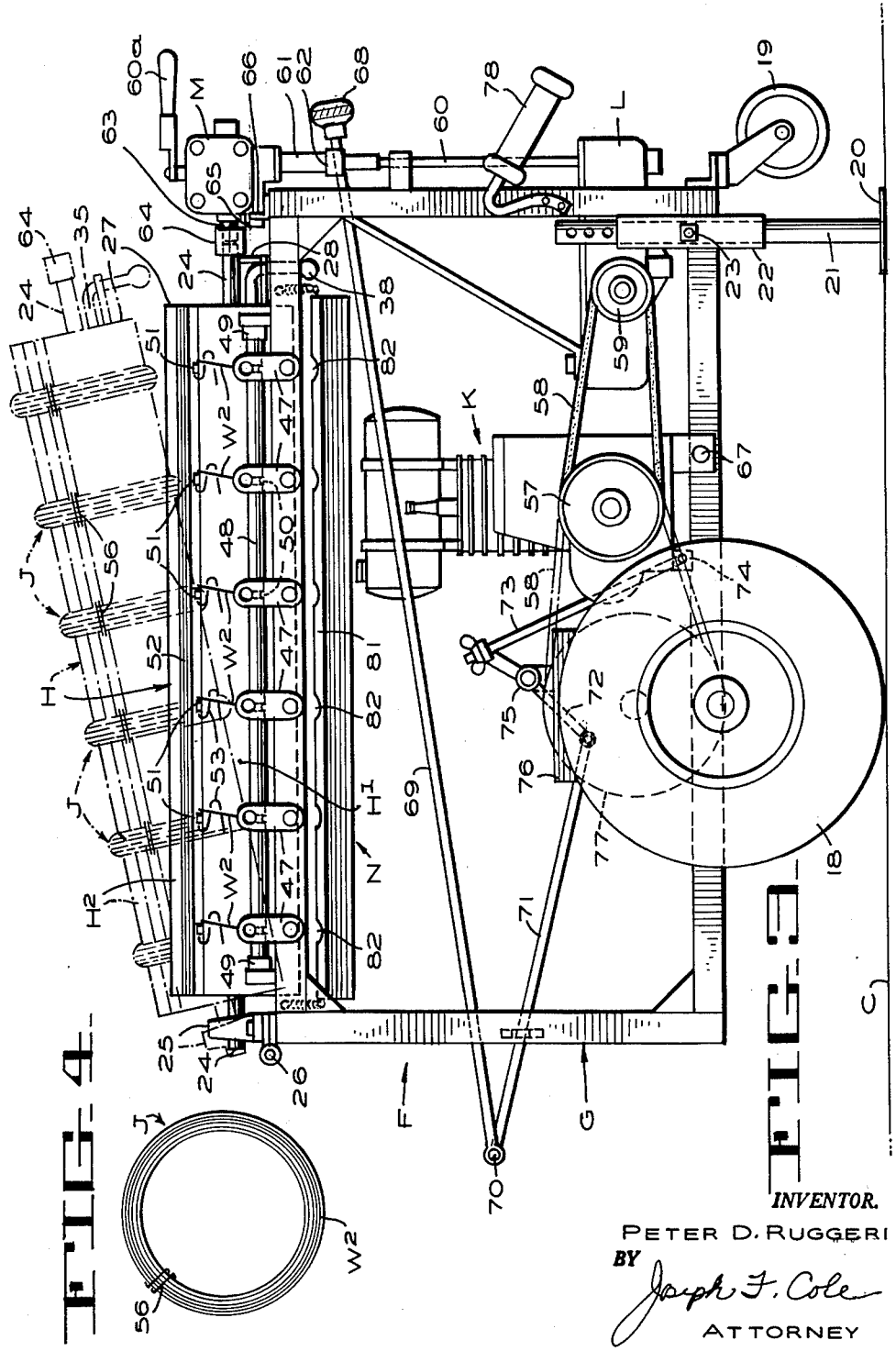

July 24, 1962 P. D. RUGGERI 3,045,936
MACHINE FOR PULLING SUPPORTING WIRES FROM A TRELLIS
Filed May 29, 1961 3 Sheets-Sheet 3
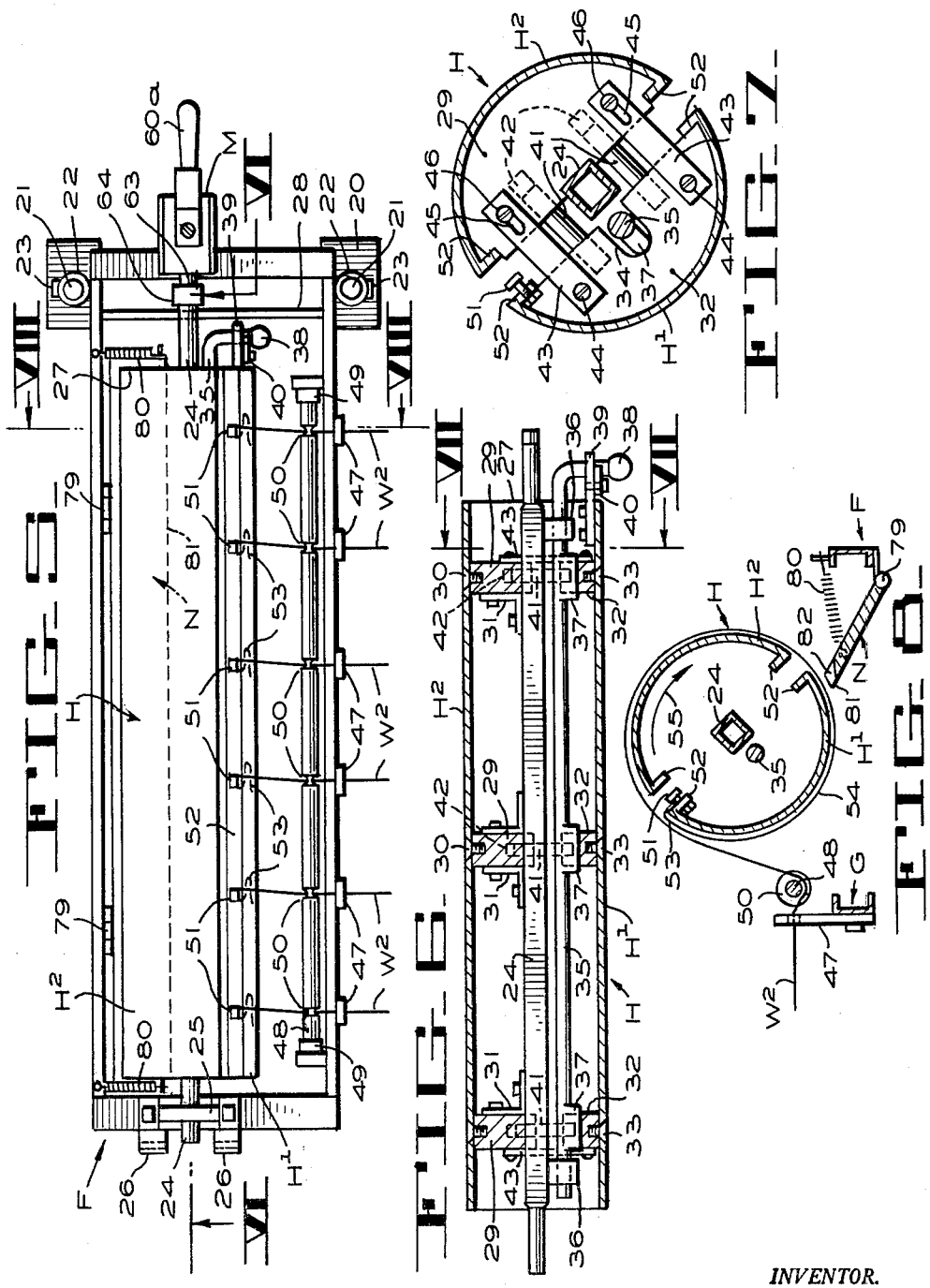
INVENTOR.
PETER D. RUGGERI
BY
Joseph F. Cole
ATTORNEY United States Patent Office 3,045,936
Patented July 24, 1962

3,045,936
MACHINE FOR PULLING SUPPORTING WIRES FROM A TRELLIS
Peter D. Ruggeri, % Silver Terrace Nursery, 525 Chesnut Ave., South San Francisco, Calif.
Filed May 29, 1961, Ser. No. 113,369
2 Claims. (Cl. 242—54)

The present invention relates to improvements in a machine for pulling supporting wires from a trellis. It consists of the combinations, constructions and arrangement of parts, as hereinafter described and claimed.

It is common practice to provide a trellis in a commercial nursery for supporting various flowers and shrubs, such as carnations or roses, as they grow upwardly from a planting bed. Such a trellis is so constructed as to define a plurality of screens arranged one above the other, the mesh of the screens being sufficiently large that the flowers and shrubs may grow upwardly therethrough, with the screens holding adjacent flowers and shrubs in spaced relations and supporting them as they grow in height. Such screens are fashioned from wires that extend lengthwise of the rows of flowers and shrubs, with strings being attached to the wires to extend transversely of the rows.

From time to time the nurseryman cuts the flowers and shrubs with stems of desired lengths. However, after a period of time, for instance two seasons, it is necessary to remove the remainder of the flowers and shrubs, including the roots, from the planting beds and then to plant a new stock.

In following such practice, the nurseryman first cuts the strings from the outermost wires, and then the intermediate wires are manually removed from the trellis, requiring a great deal of time and labor.

As the cardinal object of my invention, it is proposed to provide a machine that may be actuated so as to pull all of the intermediate wires constituting a screen, after the strings of this particular screen have been cut from the outermost wires. The wires are wound on a drum as they are removed from the trellis, each wire being wound into an individual coil, with all kinks being removed from the wires as they are wrapped around the drum during rotation of the latter. The same machine may be utilized for pulling the wires from the other screens on the trellis, thereby clearing the trellis area of the screens so that the residual portions of the flowers and shrubs may be removed with facility and ease, and the new stock planted.

Other objects and advantages will appear as the specification continues. The novel features will be set forth in the appended claims.

Drawings

For a better understanding of the invention, reference should be had to the accompanying drawings, forming part of this specification, in which:

FIGURE 1 is a fragmentary top plan view of a trellis, and diagrammatically disclosing my machine being used for removing the supporting wires from the trellis;

FIGURE 2 is a vertical sectional view taken along the longitudinal plane II—II of FIGURE 1;

FIGURE 3 is a side elevational view of my machine for pulling the supporting wires from the trellis;

FIGURE 4 is an end elevational view of a coil of wire after it has been removed from a drum of the machine;

FIGURE 5 is a top plan view of the wire-pulling machine;

FIGURE 6 is a longitudinal sectional view taken along the plane VI—VI of FIGURE 5, but with the drum rotated into a different position;

FIGURE 7 is an enlarged transverse sectional view taken along the plane VII—VII of FIGURE 6; and FIGURE 8 is a transverse sectional view taken along the plane VIII—VIII of FIGURE 5.

While I have shown only the preferred form of my invention, it should be understood that various changes, or modifications, may be made within the scope of the annexed claims without departing from the spirit thereof.

Detailed Description

Referring to the drawings in detail, I have shown a trellis which is designated generally at A in FIGURES 1 and 2. This trellis is provided with a pair of end frames B and a plurality of intermediate frames $B^1$ arranged at desired intervals along the length of the trellis. Each of these frames is disposed upright and is defined by a pair of vertical posts 10 that are arranged in spaced relation with one another, these posts having a plurality of horizontal bars 11 secured thereto. As shown in FIGURE 2, the lower ends of the posts 10 are driven into the ground C, while the bars 11 are spaced one above the other along the height of these posts.

Moreover, boards 12 rest on the ground C so as to provide a rectangular cribbing that is secured to the end posts 10, the cribbing defining a planting bed D in which various flowers and shrubs may be planted, such as carnations or roses. It will be noted that a plurality of screens E are arranged one above the other, with these screens being supported by the horizontal bars 11 of the frames B and $B^1$.

In following the conventional practice, each screen E has a pair of outermost longitudinal wires $W^1$ attached to the outer ends of the bars 11 by loops 14 fashioned in these wires (see FIGURE 1). Likewise, a plurality of intermediate longitudinal wires $W^2$ forming part of each screen E are supported by the horizontal bars 11. All of the wires $W^1$ and $W^2$ are arranged parallel with one another so as to extend lengthwise of the trellis A. The intermediate wires $W^2$ are secured to the bars 11 of the end frames B at opposite ends of the trellis by loops 15, while these wires merely rest on the horizontal bars 11 of the intermediate frames $B^1$ (see FIGURE 2). Strings S extend transversely relative to the trellis, and each string has its opposite ends tied to the outermost wires $W^1$ by knots 16 (see FIGURE 1). Loops 17 are fashioned in the strings S to extend loosely around the intermediate wires $W^2$.

It will be quite apparent that the screens E define a mesh sufficiently large for flowers and shrubs to grow upwardly therethrough from the planting bed D, the several screens being arranged along the height of the posts 10.

As previously pointed out, the flowers or shrubs may be cut by the nurseryman or florist, but after a couple of seasons they must be replaced by a new stock. As the first step, the knots 16 may be cut from the outermost pair of wires $W^1$. Then the wires $W^1$ may be removed manually from the opposite ends of the horizontal bars 11. At this time, the loops 17 in the strings will be sufficiently loose to permit the several intermediate wires $W^2$ to be pulled endwise through the flowers or shrubs, thus affording the nurseryman unobstructed access to the planting bed D for removing the remaining portions of the old plants and planting a new stock.

In order to pull the intermediate wires $W^2$, here shown as being six in number for each screen E but not limited thereto, I have provided a wire-pulling machine designated generally at F in FIGURES 1, 2, 3 and 5 of the drawings. As shown in FIGURES 1 and 2, the machine F is arranged adjacent to one end of the trellis A. Now the loops 15 are unfastened from the horizontal bars 11 at the ends of each screen E, and preferably the loops 15 of one screen at a time are untied. In this way, the intermediate wires $W^2$ of one screen at a time may be removed by the machine F, without becoming entangled with the wires of the other screens.

Now I shall set forth the structural details of the wire-pulling machine F. It defines a roll-about carriage frame G having a pair of main wheels 18 that are adapted to be moved over the ground C, as disclosed in FIGURES 2 and 3. A swivel dolly wheel 19 is provided at one end of the carriage frame G, and this dolly wheel may engage with the ground C, when the machine is being moved from place to place.

For the purpose of holding the machine F stationary when pulling the several intermediate wires $W^2$ from the trellis A, I have provided a pair of plates 20 which are carried by the lower ends of standards 21 so as to bear against the ground C, when these standards are lowered (see FIGURES 3 and 5). The standards 21 are slidably guided in vertical tubes 22 that are fixed to the carriage frame G, as shown in FIGURE 3. These standards are held in adjusted position by bolts 23 that pass through the standards 21 and the tubes 22. Of course, the standards 21 and their plates 20 may be raised so that the dolly wheel 19 will contact with the ground C, when the machine F is being moved about.

As an important feature of my wire-pulling machine, I provide a rotatable drum H upon which the several intermediate wires $W^2$ may be wound, all of these intermediate wires of one of the screens E being pulled from the trellis A and wrapped around the drum H in a single operation. Each of these wires will be formed into a coil J, as shown in FIGURES 3 and 4. The drum H is made of the expandable-contractable type. Any suitable means may be used to expand and contract the diameter of this drum.

With respect to the details of the drum H, it defines a pair of substantially semi-cylindrical shells $H^1$ and $H^2$ which are mounted on opposite sides of a supporting shaft 24, with the convexities of these shells facing in opposite directions, thus providing a substantially cylindrical drum. As shown in FIGURES 3 and 5, the shaft 24 has one end thereof rotatably mounted in a pillow bearing 25, the latter being secured by hinges 26 to the carriage frame G. This arrangement will permit the shaft 24 and the drum H to be swung into an upwardly-inclined position, as illustrated by dot-dash lines in FIGURE 3, whereby the several coils J of wire may be removed from the end 27 of the drum. The opposite end of the shaft 24 will rest on an arched bracket 28 fixed to the carriage frame G, when this shaft is disposed in a horizontal position (see FIGURES 3 and 5).

Referring to FIGURES 6 and 7, it will be observed that a plurality of blocks 29 are secured to the interior surface of the shell $H^2$ by countersunk screws 30, and these same blocks are attached to the supporting shaft 24 by angle brackets 31. Accordingly, the drum shell $H^2$ is mounted in fixed relation with respect to the shaft 24.

On the other hand, the drum shell $H^1$ is mounted for movement toward and away from the shaft 24. For this reason, a plurality of blocks 32 are secured to the interior surface of the shell $H^1$ by screws 33, and each of these blocks has a recess 34 fashioned therein (see FIGURE 7). In order to move the shell $H^1$ away from the shell $H^2$ and thereby expand the drum H, an operating rod 35 is provided, this rod being rotatably supported in bearing blocks 36 that are fixed to and project from the supporting shaft 24 (see FIGURE 6). Lugs 37 are formed on the rod 35 at intervals along the length of the latter, with one of these lugs extending into each of the recesses 34 of the blocks 32 (see FIGURE 7).

Any suitable means may be provided for rotating the rod 35 and thereby expand or contract the drum H. For this purpose, a crank arm 38 has been fashioned on one end of the rod 35, and this crank arm is disposed beyond the end 27 of the drum so as to be accessible for operation. In order to hold the drum in expanded position, as shown in FIGURES 5 to 8, inclusive, a bracket 39 has been secured to the drum shell $H^1$ so as to project therefrom, and this bracket has a latch 40 swingably secured thereto. When this latch is swung in one direction, it will engage over the crank arm 38 so as to hold the latter against movement. However, the latch 40 may be disengaged from the crank arm so that the rod 35 may be turned into a position wherein the movable shell $H^1$ may be moved toward the fixed shell $H^2$ so that the drum H may be contracted, thereby permitting the coils J of wire to be freely slipped from the drum.

As illustrated in FIGURES 6 and 7, a pair of parallel pins 41 are anchored to each of the blocks 32, and these pins slidably project into bores 42 fashioned in the blocks 29. The purpose of these pins is to guide the drum shell $H^1$ as it is moved toward and away from the drum shell $H^2$ during contraction and expansion of the drum H. A pair of straps 43 are anchored by screws 44 to the outermost blocks 32, and these straps have slots 45 fashioned therein through which screws 46 are inserted into the outermost blocks 29 (see FIGURE 7). These straps serve to limit the outward movement of the drum shell $H^1$ relative to the drum shell $H^2$.

It will be noted from FIGURES 1, 2, 3, 5 and 8 that the several intermediate wires $W^2$ may be extended lengthwise from the trellis A, with these wires being guided through apertured brackets 47 that are secured to the carriage frame G. These brackets are spaced apart at the same distance as the wires $W^2$ on the trellis, and there is a separate bracket 47 for each intermediate wire.

After passing through the apertured brackets 47, the wires $W^2$ pass beneath a roller 48 that extends parallel with the shaft 24, when the latter is disposed in horizontal position. This roller is rotatably supported in bearing blocks 49 that are mounted on the carriage frame G. The roller 48 has a plurality of annular grooves 50 fashioned therein, which are disposed in alignment with the apertured brackets 47. The intermediate wires $W^2$ are guided through the grooves 50 as they pass from the bracket 47 to the outer periphery of the drum H.

In FIGURES 3, 5, 7 and 8, a plurality of wire-anchoring studs or pins 51 have been shown, one for each of the intermediate wires $W^2$, the studs 51 being aligned with the apertured brackets 47 and the annular grooves 50 of the roller 48. Each of the drum shells $H^1$ and $H^2$ are provided with a pair of inwardly-extending marginal flanges 52 on their longitudinal edges, and the studs 51 are fixed to one of these flanges (see FIGURE 8). The near or adjacent end 53 of each intermediate wire $W^2$ is wrapped around one of the studs 51, and then the free adjacent end of the wire is looped and placed between the peripheral surface of the drum shell $H^1$ and the first convolution 54 of the wire $W^2$ as the latter encircles the drum H (see FIGURES 3, 5 and 8). Thus, when the drum is rotated in the direction of the arrow 55 in FIGURE 8, the intermediate wires $W^2$ will be pulled from the trellis A and wrapped around the drum H to provide the coils J.

Particular attention is called to the fact that the longitudinal marginal flanges 52 on the shell $H^1$ are separated from the longitudinal flanges 52 on the shell $H^2$, when the drum H is expanded and the wires $W^2$ are being wrapped therearound. This arrangement will provide ample working space between the drum shells so that the remote or far ends 56 of each intermediate wire $W^2$ may be twisted around its respective coil J, while the latter still remains on the drum H (see FIGURES 1 and 3).

Upon contracting the drum H by actuating the crank arm 38, the coils J of the wires $W^2$ may be freely removed over the end 27 of the drum, while the twisted ends 56 will prevent the coils from unwrapping (see FIGURE 4).

Any suitable mechanism may be utilized for rotating the drum H and thereby pulling all of the intermediate wires W² of a selected screen E from the trellis during operation of the wire-pulling machine F. For this purpose, I have shown a gasoline engine K as constituting the source of power. This engine has a drive pulley 57 which is connected by a belt 58 to a driven pulley 59 of a gear transmission L (see FIGURE 3). As disclosed, an output shaft 60 extends vertically from the transmission L, and this shaft is connected to an input shaft 61 of a detachable transmission M by a coupling 62.

With particular reference to FIGURES 3 and 5, it will be seen that the drive transmission M has an output shaft 63. The latter may be detachably connected to the supporting shaft 24 of the drum H by a coupling 64 so as to impart rotary motion to this drum.

In FIGURE 3, the transmission M has been shown as being provided with a hook 65 that is adapted to engage over an angle bar 66 fixed to the carriage frame G. The construction is such that the drive transmission M may be readily detached from the shafts 24 and 60 by grasping a handle 60a and lifting this transmission. This will permit the drum H to be swung upwardly into the dot-dash line position shown in FIGURE 3 so that the coils J may be freely slipped therefrom, after the drum has been contracted and the looped ends 53 of the wires W² have been disengaged from the anchoring studs 51. The looped ends 53 are exposed so that they may be easily grasped by the nurseryman.

In order to maintain the proper tension on the belt 58, the engine K has been pivotally connected to the carriage frame G by an offset journal pin 67 about which the engine may swing by gravity so as to tighten the belt. However, the nurseryman may swing the engine in a clockwise direction in FIGURE 3 so as to loosen the belt by pulling a knob 68 to the right. This knob is fixed to a pull rod 69 which is connected by a hinge pin 70 to a push rod 71. The latter is connected to one end of a lever 72, the opposite end of this lever being connected to a rod 73. The latter is pivotally attached to a bracket 74 on the engine. The lever 72 is swingably mounted intermediate of its ends in a bearing block 75 that is mounted on a plate 76 secured to the carriage frame G.

The foregoing construction is such that when the knob 68 is pulled to the right in FIGURE 3, the engine will be swung about the journal pin 67 so as to loosen the belt 58 and thereby stop rotation of the driven pulley 59. However, when the knob 68 occupies the position shown in FIGURE 3, the weight of the engine K will maintain the belt 58 tight so that the engine will drive the drum H. Of course, any other suitable belt tightener may be utilized.

When moving the wire-pulling machine F from place to place, the belt 58 may be placed over the drive pulley 57 and a pulley 77, the latter being arranged to impart rotary motion to the traction wheels 18 so as to advance the machine over the ground C. Suitable handles 78 have been provided on the carriage frame G so that the nurseryman may assist in moving and guiding the machine about.

As a further structural feature, I have provided a guide bar N for shaping the several intermediate wires W² in neat coils J, as these wires are wrapped around the drum H (see FIGURES 3, 5 and 8). This guide bar is swingably attached by hinges 79 to the carriage frame G, and springs 80 yieldingly urge the free longitudinal edge 81 of the guide bar towards the drum H. Concave saddles or notches 82 are fashioned at spaced intervals along the length of the guide bar N, one for each of the coils J. These saddles are disposed in alignment with the grooves 50 of the roller 48 and the wire-anchoring studs 51.

As disclosed in FIGURE 3, the guide bar N extends lengthwise of the drum H; and the concave saddles 82 are disposed to receive the wires W² as the convolutions of the wires are added to the rotating drum as they are pulled from the trellis, with the saddles shaping the wires into neat coils. As the wires are pulled through the apertured brackets 47 and the grooves 50 in the roller 48, all kinks will be removed from these wires, and thus the wires may be used again.

After the several wires W² have been pulled from the screen at one elevation on the trellis, the same machine may be utilized for pulling the several wires W² from the screen E at a different elevation on the trellis, as indicated in FIGURE 2. The apertured brackets 47 and the annular grooves 50 serve to guide the wires W² to the rotating drum H, regardless of the elevation of a selected screen E. In this manner, all of the screens E may be removed from the trellis A, affording the nurseryman unobstructed access to the planting bed D for planting new flowers and shrubs therein. Of course, the screens E must be replaced on the trellis to support the stems of the new flowers and shrubs as they grow in height.

I claim:
1. In a machine for pulling supporting wires from a trellis:
(a) a carriage frame movable into a position adjacent to one end of a trellis;
(b) a drum rotatably mounted on the carriage frame;
(c) means for anchoring one end of each of several supporting wires to the drum;
(d) means operable for rotating the drum to simultaneously pull the several supporting wires from the trellis, and to wind the wires in separate coils around the periphery of the drum;
(e) a plurality of spaced brackets provided on the carriage frame, one for each supporting wire, and being fashioned with apertures through which the supporting wires pass from the trellis to the drum, whereby the coils or wire will be separated one from the other as they are wound upon the drum;
(f) a roller mounted on the carriage frame to extend lengthwise of the drum;
(g) the roller being disposed between the drum and the apertured brackets;
(h) the roller being fashioned with a plurality of annular grooves therein that are spaced along the length of the roller so that each groove is aligned with one of the apertured brackets;
(i) the annular grooves being positioned so that the supporting wires will be pulled therethrough to remove kinks from these wires as they pass from the apertured brackets to the periphery of the drum;
(j) a guide bar mounted to extend lengthwise of the drum;
(k) the guide bar being fashioned with a plurality of concaved saddles therein, which are spaced one from the other along the length of the guide bar so that each concaved saddle is aligned with one of the apertured brackets;
(l) these saddles being positioned so that the convolutions of the supporting wires will be guided therethrough to thereby shape the coils as the wires are wrapped around the drum;
(m) and yielding means urging the guide bar toward the periphery of the drum, whereby the guide bar may be moved away from the drum as the diameters of the coils increase during the winding of the supporting wires on the drum.

2. In a machine for pulling supporting wires from a trellis:
(a) a carriage frame movable into a position adjacent to one end of a trellis;
(b) a drum rotatably mounted on the carriage frame;
(c) the drum having a pair of drum shells extending lengthwise of one another;

(d) means operable for moving one drum shell toward and away from the other in parallel relation with one another, whereby the drum may be contracted and expanded in diameter;

(e) at least one of the drum shells being provided with a longitudinal flange extending inwardly of the drum;

(f) a plurality of studs mounted on and projecting from the flange, there being one stud for each of the several supporting wires to be wrapped around the drum;

(g) the studs being exposed for free access by an operator when the drum shells are moved apart and positioned so that an adjacent end of each of the wires may be wrapped around one of the studs and then the free adjacent end of each wire may be looped and placed between the peripheral surface of the flanged drum shell and the first convolution of the wire as the latter encircles the drum;

(h) means operable to rotate the drum to simultaneously pull the several supporting wires from the trellis, and to wind each of the wires in a separate coil extending around the periphery of the drum, when the drum is expanded in diameter;

(i) the drum shells being separated from one another, when the drum is expanded in diameter, and affording ample working space therebetween through which remote ends of the supporting wires may pass so that these remote ends of the wires may be wrapped around their respective coils, while the latter still remain on the drum;

(j) the drum having an end over which the coils of wire may be freely removed, when the drum is contracted in diameter;

(k) a shaft provided for supporting the drum;

(l) a coupling detachably connecting one end of this shaft to the means for rotating the drum;

(m) and means swingably mounting the other end of the supporting shaft so that the shaft and drum may be swung into a predetermined position to clear the carriage frame for removal of the coils of wire over said end of the drum, when the coupling is detached from the drum-rotating means.

References Cited in the file of this patent
UNITED STATES PATENTS

| | | |
|---|---|---|
| 600,852 | Baisley | Mar. 22, 1898 |
| 825,951 | Adams | July 17, 1906 |
| 1,329,240 | Hays | Jan. 27, 1920 |
| 1,868,667 | Leidy et al. | July 26, 1932 |
| 2,146,590 | Newell | Feb. 7, 1939 |
| 2,250,269 | Lockwood | July 22, 1941 |
| 2,815,905 | Birchler et al. | Dec. 10, 1957 |